J. B. DONALD.
ENGINE PLOW.
APPLICATION FILED AUG. 23, 1910.

991,961. Patented May 9, 1911.

Witnesses.

Inventor:
J. B. Donald.

UNITED STATES PATENT OFFICE.

JOHN BROWNLEE DONALD, OF WINDSOR, ONTARIO, CANADA.

ENGINE-PLOW.

991,961.            Specification of Letters Patent.      Patented May 9, 1911.

Application filed August 23, 1910. Serial No. 578,549.

*To all whom it may concern:*

Be it known that I, JOHN BROWNLEE DONALD, a subject of the King of Great Britain, and resident of the city of Windsor, county of Essex, Province of Ontario, in the Dominion of Canada, have invented certain new and useful Improvements in Engine-Plows; and I do hereby declare that the following is a full, clear, and exact description of the same.

The invention relates to improvements in engine plows, as described in the following specification and illustrated in the accompanying drawings that form part of the same.

The invention consists essentially in the novel construction and arrangement of parts, whereby the forward pivotal ends of the plow beams are supported from a frame adjustably connected to the main frame.

The objects of the invention are, to facilitate the adjustment of the plow to suit varying conditions of ground, to allow the complete withdrawal of the plows from the ground, and to devise an engine plow, the structure of which may be handled with ease and celerity.

Figure 1:
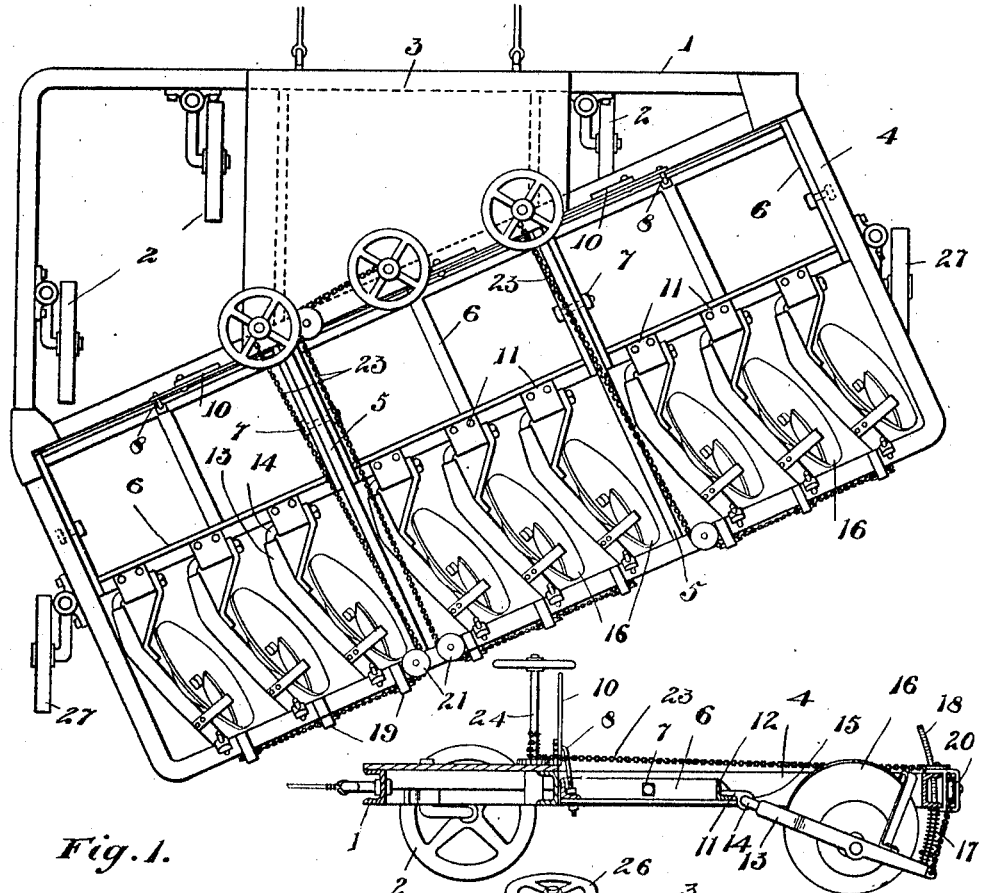
Figure 2:
Figure 3:
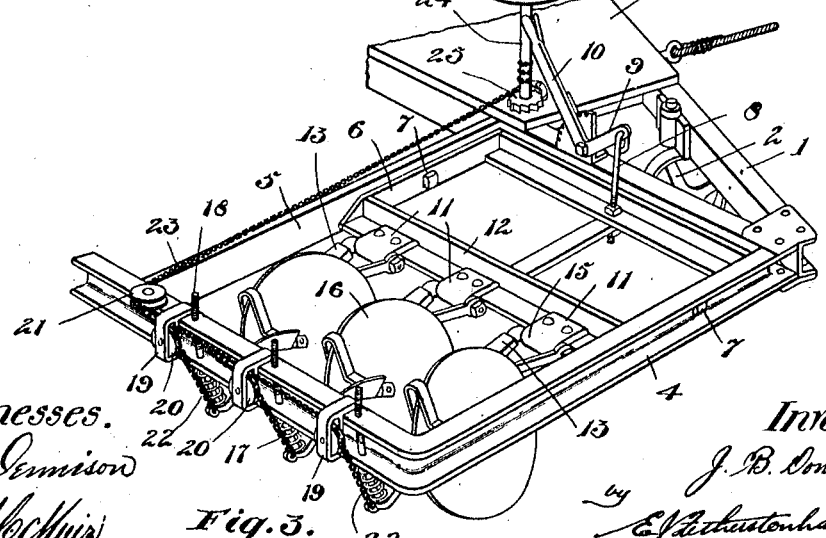

In the drawings, Figure 1 is a plan view of a plow constructed in accordance with my invention. Fig. 2 is a cross sectional elevational view. Fig. 3 is a perspective detail of one end of the plow showing the mechanism for operating the same.

Like numerals of reference indicate corresponding parts in each figure.

Referring to the drawings, 1 is the main frame formed triangular in shape and preferably constructed of suitable steel sectional beams, said frame being supported from the ground on the pivotal caster wheels 2.

3 is a suitable platform covering in a portion of the frame 1.

4 is the rear extension frame rectangular in form and extending from the rear side of the triangular main frame 1 at the angle to the front side. The frame 4 is divided into a plurality of sections by the cross bars 5.

6 are frames formed of suitable structural members and rectangular in shape and fitting between the cross bars 5 and the end members of the rear extension 4, said frames being pivotally supported upon suitable bolts 7.

8 are rods or links adjustably secured to the front sides of the pivotal frames 6 having their looped upper ends secured to the angle extensions 9 of the quadrant levers 10 pivotally supported from the main frame. The frames 6 are rigidly held in any desired position being tilted on their pivots by said quadrant levers.

11 are brackets rigidly secured to the rearwardly extending flange 12 of the rear side members of the frames 6.

13 are the plow beams angular in shape and having the laterally arranged shank portions 14 pivotally secured in the journal portions 15 of the brackets 11.

16 are the plow disks rotatably secured to the plow beams. The beams are held downwardly to their work by spiral compression springs 17 encircling the arc-shaped rods 18 secured to the outer ends of said beams and extending upwardly through the rear side of the frame 4, said springs being suitably adjusted. The plows are thus connected up in gangs so that by operating the levers 10 the forward ends of the plow beams of the various gangs may be raised or lowered to the desired height to give the best results when the ground is being worked. This adjustment of the front ends of the plow beams is a very important feature in the operation of the plows and while it is shown attached to a disk plow the use of a pivotal subframe to which the front end of the plow beam is pivotally connected forms the essential feature of this invention.

The other features of construction of the plow beams and their pivotal supports are more particularly described and covered in an accompanying application filed under Serial Number 578,548 on the 23rd of August 1910.

19 are brackets rigidly secured to the rear side of the frame 4 vertically above the outer ends of the rearwardly extending plow beams, said brackets having the grooved rollers 20 journaled therein.

21 are grooved rollers pivotally secured in a horizontal position to the top of the frames 4 adjacent to the cross bars 5.

22 are chains or other flexible connections secured to the outer ends of the plow beams 5 and extending upwardly over the rollers 20, said chains being grouped and connected to the common chains 23 extending around the rollers 21.

24 are spindles supported in suitable journals in the plow frame preferably at the rear of the platform 3 and extending vertically upward therefrom and having suitable ratchet wheels 25 secured to the bottom thereof. The chains 23 after passing around the rollers 21 extend forwardly and are secured to the spindles 24. It will be readily understood from this construction that on the turning of the spindles 24 by means of the hand wheels 26 secured to the top thereof, the rear of the plow beams may be raised or lowered as desired. The rear extension frame 4 is supported by the auxiliary caster wheels 27 and the whole device is drawn by an engine connected to the forward side of the main frame in any suitable manner.

In the operation of this plow, the operator standing upon the platform may by means of the levers 10 swing the pivotal frames 6 to raise or depress the front ends of the plow beams, thus varying the depth of cut, or they may be raised sufficiently high so that by winding up the chains 23 the rear ends of the plow beams may be raised so that the plows will clear the ground.

What I claim as my invention is:—

1. In an engine plow, a rigid frame, plow supporting members adjustably connected to said frame, a plurality of plow beams arranged in groups and individually supported at their front ends from said supporting members, disks on said plow beams, means for adjusting each group of disks independently, means for resiliently supporting each of said beams independently from their rear ends from said frame, and means for adjusting said supporting members independently.

2. In an engine plow, an outer frame, an inner tilting frame pivotally secured within said outer frame, a group of plow members pivotally supported from said tilting frame at their front ends and at their rear ends resiliently and individually supported from the rear bar of said outer frame.

3. In an engine plow, a main frame supported on suitable running gear, a plow frame having front and rear parallel bars and supported from said main frame and arranged in sections, a plurality of tilting frames pivotally secured in said plow frame within the front portion of said sections respectively, a plurality of plow beams in each of said sections of the plow frame pivotally secured individually at their front ends to a tilting frame and at their rear ends resiliently secured individually to the rear bar of the plow frame, and disk plows secured to said plow beams.

4. In an engine plow, a main frame supported on a suitable running gear, a plow frame having front and rear bars parallel one with the other and divided into sections, a tilting frame in each of said sections pivotally supported, a group of plow beams pivotally supported individually from the rear end of said tilting frame, a plurality of springs, each of said springs supporting a plow beam from the rear bar, disk plows secured to said plow beams, and means for raising and lowering said plow beams by groups independently of the rear resilient supports.

5. In an engine plow, the combination with a main frame supported on suitable wheels, of a horizontally arranged frame pivotally supported at the ends intermediate of its length, a lever and quadrant supported from the main frame, means connecting the front side of said pivotal frame with said lever, and a plow pivotally connected to the rear side of said pivotal frame.

6. In an engine plow, the combination with a main frame supported on suitable wheels, of a horizontally arranged frame pivotally supported at the ends intermediate of its length, means for tilting said frame on its pivot, a bracket having a journal bearing therein rigidly secured to the rear side of said pivotal frame, a plow beam having a laterally arranged shank journaled in said journal bearing and adapted to swing vertically, a plow secured to said plow beam, and means for raising and lowering the rear end of said plow beam.

7. In an engine plow, the combination with a main frame supported on suitable wheels, of a horizontally arranged frame pivotally supported at the ends intermediate of its length, means for tilting said frame on its pivot, a plurality of brackets rigidly secured to the rear side of said horizontally tilting frame having horizontally arranged journal bearings therein, a plurality of plow beams having laterally arranged shanks extending into said journal bearings, disks rotatably secured to said plow beams, and means for raising and lowering the rear ends of said plow beams.

8. In an engine plow, the combination with a main frame supported on suitable wheels and having a supplemental frame extending angularly therefrom, a plurality of frames horizontally arranged and supported at their sides on suitable pivots arranged intermediate of their length, means for tilting said frames on their pivots, a plurality of plows pivotally connected to the rear sides of said pivotal frames, pulleys supported from said supplemental frame above the rear ends of said plows, flexible members connected to the rear ends of said plows and extending over said pulleys, and rotatable spindles vertically secured in suitable bearings on said main frame and connected to said flexible members and adapted to raise and lower said plows.

Signed at the city of Toronto, county of York, Providence of Ontario, in the Dominion of Canada, this 13 day of August, 1910.

JOHN BROWNLEE DONALD.

Witnesses:
E. HERON,
P. SHEE.